United States Patent [19]

Tillion

[11] Patent Number: 4,939,814
[45] Date of Patent: Jul. 10, 1990

[54] CULTURED MUSSEL CLEANING MACHINE

[76] Inventor: Diana R. Tillion, P.O. Box 6409, Halibut Cove, Ak. 99603

[21] Appl. No.: 438,579

[22] Filed: Nov. 17, 1989

[51] Int. Cl.$^5$ .............................................. A22C 29/04
[52] U.S. Cl. .......................................... 17/74; 17/65; 17/48
[58] Field of Search ........................... 17/74, 65, 48, 53

[56] References Cited

U.S. PATENT DOCUMENTS

| | | | |
|---|---|---|---|
| 1,779,046 | 10/1930 | McNaney | 17/53 |
| 3,238,560 | 3/1966 | Jurisich | 17/48 |
| 4,236,276 | 12/1980 | Van Twuyver et al. | 17/74 |
| 4,312,099 | 1/1982 | Cohen | 17/74 |
| 4,330,904 | 5/1982 | Lambert | 17/74 |
| 4,532,677 | 8/1985 | Wenstrom et al. | 17/74 |
| 4,538,327 | 9/1985 | Einarsson | 17/74 |

*Primary Examiner*—Willis Little
*Attorney, Agent, or Firm*—Cassidy, Vance & Tarleton

[57] ABSTRACT

A cultured mussel cleaning machine (10) for cleaning fragile-shelled mussels, the machine (10) having a first staged (12) and a second stage (14). The first stage (12) includes a cylindrical container (16) in which is mounted a series of rotating chains (48) and flexible, abrasive gloves (56) that break apart and clean mussels (70) as they move from a loading chute (34) to a drain (72) by the force of pressurized water (68). Mussels (70) exiting the first stage (12) enter the second stage (14) where they travel down an inclined series of abrasive rollers (106). The mussels (70) are gently pressed against the abrasive rollers (106) by compressible material (112) formed on the underside (110) of a lid (84) placed over the rollers (106). The cleaned mussels (70) pass over a second drain (116) and into a container (120). The second stage (14) is detachable from the first stage (12) for remote operation where the rollers (106) are powered by a manual crank (134).

20 Claims, 4 Drawing Sheets

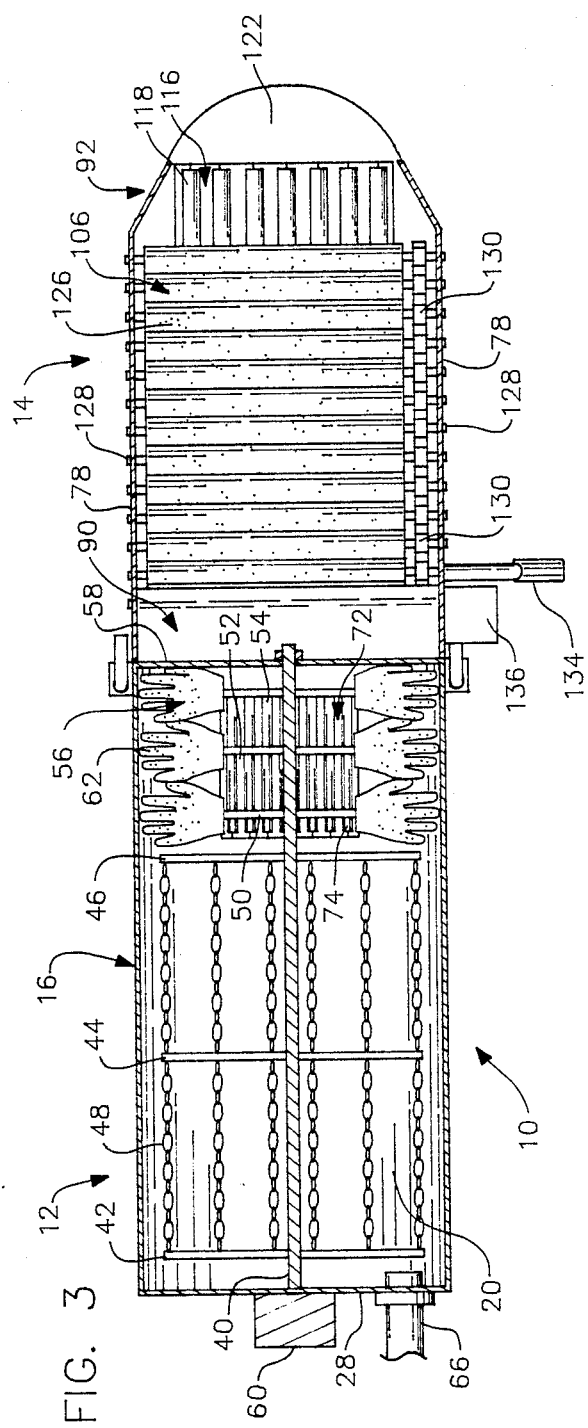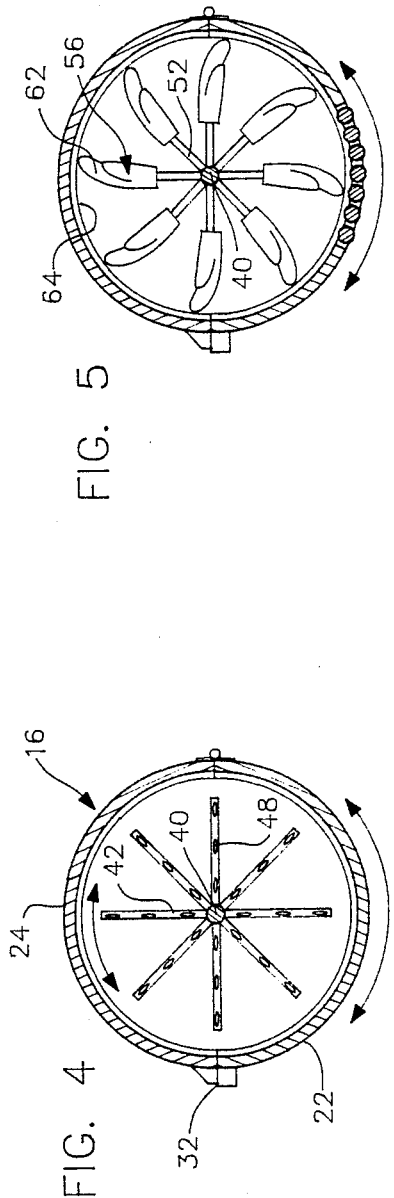

CULTURED MUSSEL CLEANING MACHINE

TECHNICAL FIELD

The present invention pertains to devices for mechanically cleaning shellfish, and, more particularly, to a machine for cleaning cultured fragile-shelled mussels.

BACKGROUND OF THE INVENTION

One branch of the field of mariculture is the growing of cultured mussels for commercial use. In some commercial operations, mussels are grown on lines in the open waters where they can be easily harvested. A unique characteristic of line-grown cultured mussels is that their shells are fragile and tender as compared to cultured mussels grown with other methods. This is particularly true of mussels grown on lines in the waters of the northwestern United States.

In order to enhance the commercial value of cultured mussels, it is necessary for the grower to clean the mussels prior to shipping them to market. Machines have been developed to mechanically clean shellfish to remove barnacles and other waste material from the shells. One drawback to these shellfish cleaning machines is they are designed to clean shellfish having very hard shells. As a result shelled mussels passing through these machines will be damaged and/or destroyed, rendering them commercially unfit. As a result, growers are left to hand clean the mussels by hand, which is labor-intensive and not commercially viable. Hence, there is a need for a machine that can clean large amounts of fragile-shelled mussels in a relatively short period of time without damaging the mussel shells.

SUMMARY OF THE INVENTION

The present invention is directed to a cultured mussel cleaning machine for cleaning fragile-shelled mussels. Ideally, the machine is formed to have two detachable stages. The first stage comprises an elongate, enclosed container for holding water and mussels. The container has a loading chute at one end for loading mussels into the container and an outlet at the other end through which mussels exit the container. The container further includes a fluid port adjacent the loading chute for admitting pressurized fluid into the container to force mussels toward the outlet and to wash the shell of the mussels. A drain is located adjacent the outlet of the container for draining fluid and waste material. A plurality of looped, flexible filaments, ideally formed from metal chain, are positioned adjacent the loading chute and mounted to rotate about the longitudinal axis of the container to break apart mussels that are clumped together and off unwanted material from the exterior of the mussels without damaging the fragile shells. A plurality of compliant, abrasive brushing members are positioned downstream from the chains and are rotated to brush and roll the mussels to further clean the exterior of the mussels.

The second stage is removably attached to the first stage and comprises a frame having a receiving end and a discharge end. The receiving end is configured to receive mussels from the outlet of the first stage when the second stage is attached to the first stage. A plurality of rollers having abrasive surfaces are mounted adjacent each other in coplanar relationship between the receiving end and the discharge end of the frame. The rollers are each coupled to a common driver for rotating the rollers in the same direction to thereby support and move the mussels across the abrasive surfaces. A lid is mounted on the frame to cover the rollers. A compressible material lines the inside surface of the lid and is spaced from the rollers such that mussels passing over the rollers will be gently pressed between the compressible material and the rollers. Ideally, the compressible material is lined with an abrasive material to further clean the mussel shells.

In accordance with another aspect of the present invention, the second stage includes a loading chute formed above the receiving end to permit independent loading of water and mussels into the second stage for independent operation thereof.

In accordance with yet another aspect of the present invention, the compliant, abrasive brushing members are formed from compliant, abrasive gloves. Ideally, each glove is mounted on the end of a rod that radially projects from a shaft positioned along the longitudinal axis of the container. Preferably, the plurality of looped, flexible chains are also mounted to radially projecting rods that are attached to the shaft such that the chains and the gloves rotate together with the shaft.

In accordance with yet another aspect of the present invention, the second stage is inclined such that the receiving end is positioned vertically higher than the discharge end.

In accordance with still yet another aspect of the present invention, the first stage includes a motor that rotates the shaft on which the loops of flexible chains and the compliant, abrasive gloves are mounted.

As will be readily appreciated from the foregoing description, the present invention provides a cultured mussel cleaning machine that is specifically adapted to accommodate fragile-shelled mussels. More particularly, the looped chains provide a flexible agitator that separates clumps of mussels and knocks unwanted material from the mussel shells while accommodating the fragile nature of the shells. In addition, the compliant gloves having an abrasive surface facilitate gentle rolling and brushing of the mussels as they move towards the drain to further remove material from the shells without damaging them. The removable second stage further refines the cleaning of the shells to enhance their appearance and marketability. Furthermore, the second stage is removable from the first stage such that it can be transported to a remote location and manually operated without the need for external power. With both stages in combination, it has been found that the machine formed in accordance with the present invention will clean approximately 100 pounds of cultured mussels in approximately 45 minutes.

BRIEF DESCRIPTION OF THE DRAWINGS

The foregoing and other features and advantages of the present invention will be more readily appreciated as the same becomes better understood by reference to the detailed description when taken in conjunction with the following drawings, wherein:

FIG. 3 is a cross-sectional top view taken along lines 3—3 of the mussel cleaning machine of FIG. 2;

FIG. 4 is a cross-sectional view taken along lines 4—4 of the mussel cleaning machine of FIG. 2;

FIG. 5 is a cross-sectional view taken along lines 5—5 of the mussel cleaning machine of FIG. 2.

DETAILED DESCRIPTION OF THE PREFERRED EMBODIMENT

Figure 1:
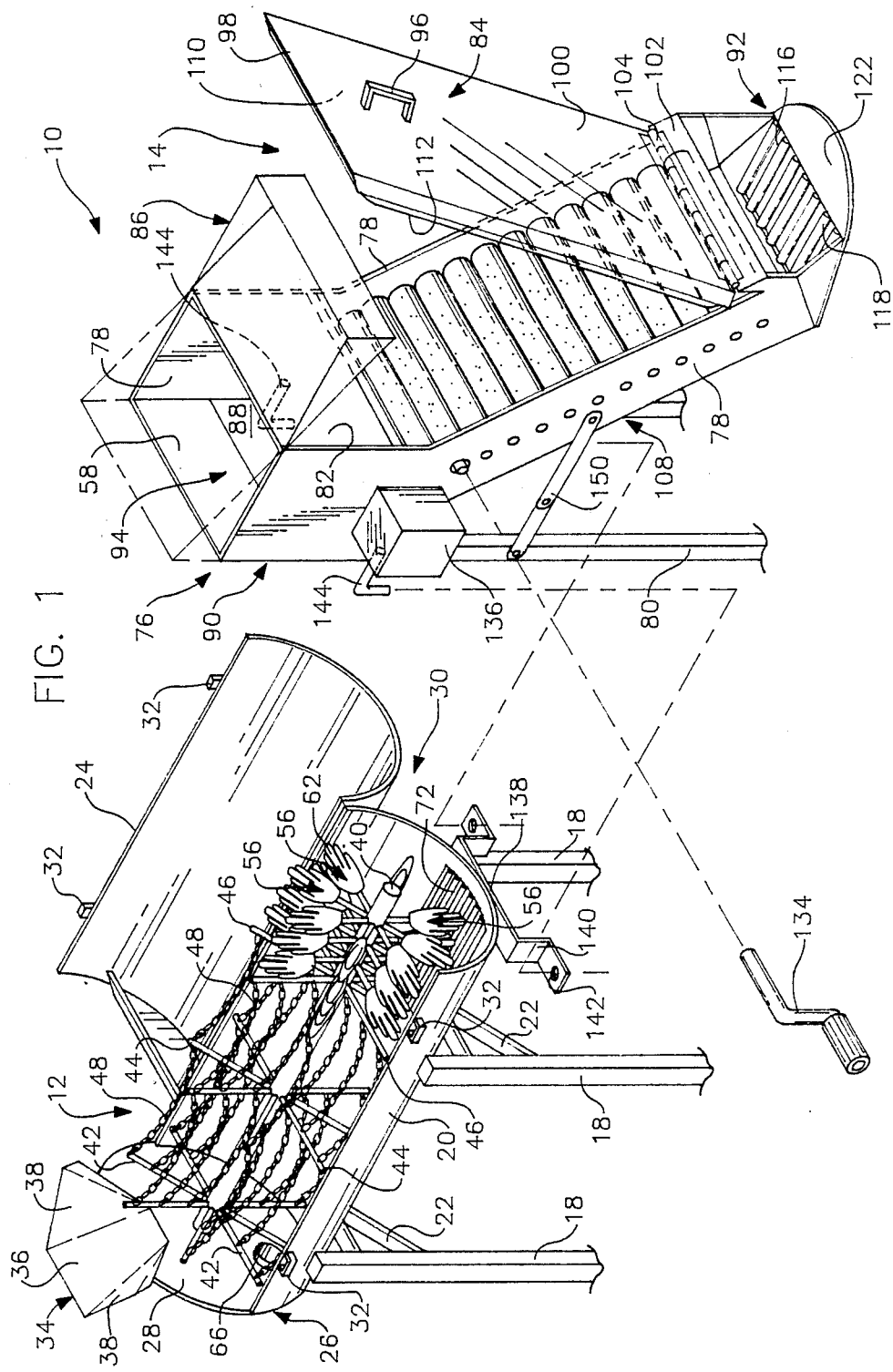
FIG. 1 is an isometric view of the first and second stages of the mussel cleaning machine formed in accordance with the present invention.

Referring initially to FIG. 1, the cultured mussel cleaning machine 10 is shown comprised of two stages, a first stage 12 and a second stage 14. The first stage 12 is formed of an elongate, cylindrical container 16 supported above the ground by four legs 18 that are attached to the bottom half 20 of the container by a framework 22. The container 16 is split down the longitudinal axis to form two halves, the bottom half 20 and a top half 24. The top half 24 is hingedly attached at one side to the bottom half 20 to act as a lid. The first end 26 of the container 16 is closed by a circular wall 28 and the second end 30 is open. The circular wall 28 projects above the bottom half 20 so that when the top half 24 is pivoted into engagement with the bottom half 20, the first end 26 is substantially enclosed. A pair of latches 32 adjacent the first end 26 and the second end 28 hold the top half 24 in engagement with the bottom half 20 when the top half 24 is closed.

A loading chute 34 comprised of a bottom 36 and a pair of angled sides 38 is formed in the circular wall 28 to allow the introduction of mussels into the container 16 at the first end 26 when the top half 24 is latched closed.

Mounted inside the container 16 is an elongate shaft 40 having one end journaled in the circular wall 28 and the other end projecting past the second end 30 of the container 16. The shaft 40 rotates about the longitudinal axis of the container 16. Spaced equidistantly about the circumference of the shaft 40 are eight rods 42 projecting radially outward therefrom and positioned adjacent the circular wall 28. Positioned approximately one-third the distance of the shaft 40 away from the circular wall 28 is a second series of eight rods 44 projecting radially outward from the shaft 40. Finally, a third series of eight radially projecting rods 46 are positioned approximately two-thirds of the length of the shaft 40 away from the circular wall 28. Each series of rods 42, 44, and 46 are longitudinal parallel.

Connected between the rods 42 and 44 and the rods 44 and 46 are a plurality of looped chains 48. The chains 48 are attached between the rods 42, 44, and 46 such that they are not taut but droop down to form a shallow loop. As shown in FIG. 1, there are three loops of chains 48 between each pair of rods 42 and 44, and 44 and 46 for a total of 48 chain loops.

Positioned on the last third of the shaft 40 adjacent the second end 30 are an additional three series of eight rods 50, 52, and 54 that project radially outward from the shaft 40 in the same manner as the first series of rods 42, 44, and 46. However, these three series are spaced much closer together. Mounted on the end of each of the rods 50, 52, and 54 is an abrasive, flexible glove 56. Preferably, the gloves 56 are rubber fishermen's gloves that are readily commercially available. Attachment of the gloves 56 and chains 48 to their respective rods is made with suitable fasteners.

The shaft 40 has the other end journaled in the back wall 58 of the second stage 14 to permit rotation in either a clockwise or counterclockwise direction. The shaft 40 may be rotated by an electric motor, or, more preferably, by an electrically driven hydraulic motor, schematically shown in FIG. 3 as the motor housing box 60. It is important that as the shaft 40 rotates, the rods do not crush the mussels as they pass along the bottom half 20 of the container 16. Thus, as shown in FIG. 4, the series of rods 42, 44, and 46 have a radius that provides clearance between the interior of the container 16 such that the mussels will have sufficient clearance between the end of the rods and the interior of the container 16. In addition, as illustrated in FIG. 5, each of the gloves 56 are mounted on the rods 50, 52, and 54 so that the fingers 62 scrape against the interior 64 of the container 16.

Referring again to FIGS. 1 through 3, a fluid entry port 66 is formed in the circular wall 28 near the bottom half 20 to permit the introduction of pressurized fluid 68, in this case water, into the container 16. The pressurized fluid 68, shown more clearly in FIG. 2, forces the mussels 70 to move from the first end 26 to the second end 30 of the first stage 12. A drain opening 72 is formed in the bottom half 20 adjacent the second end 30 to permit fluid and waste material to exit the container 16. A plurality of bars 74 are attached across the drain 72 to prevent the mussels 70 from falling therethrough. Preferably, the bars 74 are formed of rods that are placed parallel to the longitudinal axis of the container 16 to facilitate movement of the mussels 70 over the drain open 72.

Referring again to FIG. 1, the second stage 14 has a frame 76 that includes the back wall 58, a pair of sidewalls 78, a pair of folding legs 80, an upper front wall 82, a lid 84, and a cover 86. The folding legs 80 are pivotally mounted to the sidewalls 78 to fold up, thus permitting the second stage 14 to be transported to a remote location. The frame 76 has a receiving end 90 and a discharge end 92, with the receiving end 90 having opening 88 formed in the back wall 58 to receive mussels from the second end 30 of the first stage 12. The sidewalls 78, backwall 58 and upper front wall 82 project above the receiving end 90 form a hopper 94 into which mussels and water are loaded for independent operation of the second stage 14. The cover 86 is hingedly attached to the front wall 82 to pivot between a closed position to cover the hopper 94 (shown in phantom) and an open position to permit the introduction of mussels and water into the second stage 14. The lid 84 has a handle 96 formed near the upper end 98 with the lower end 100 being hingedly attached with a hinge 104 to a lower frame member 102 that bridges the lower portion of the sidewalls 78.

A plurality of rollers 106 are journaled in the sidewalls 78 and are positioned adjacent each other and are coplanar with each other between the receiving end 90 and the discharge end 92. More particularly, the rollers 106 are located in an inclined portion 108 of the frame 76 that is located between the hopper 94 and the discharge end 92. Mussels 70 are supported by the rollers 106 as they move from the hopper 94 to the discharge end 92. Preferably, each of the rollers 106 is covered with an abrasive material to clean the shells of the passing mussels 70. In addition, the underside 110 of the lid 84 is coated with a compressible material 112 such as sponge or foam. The exposed surface of the material 112 is lined with an abrasive layer 114, preferably formed of thin metal grating. The material 112 is spaced from the rollers 106 such that the mussels 70 are gently pressed between the rollers 106 and the compressible material 112 as they pass through the second stage 14.

A second drain 116 is formed at the discharge end 92 to drain the removed waste material and fluid. A plurality of rods 118 are attached longitudinally across the drain 116 to prevent mussels 70 from falling through the drain 116.

Figure 2:
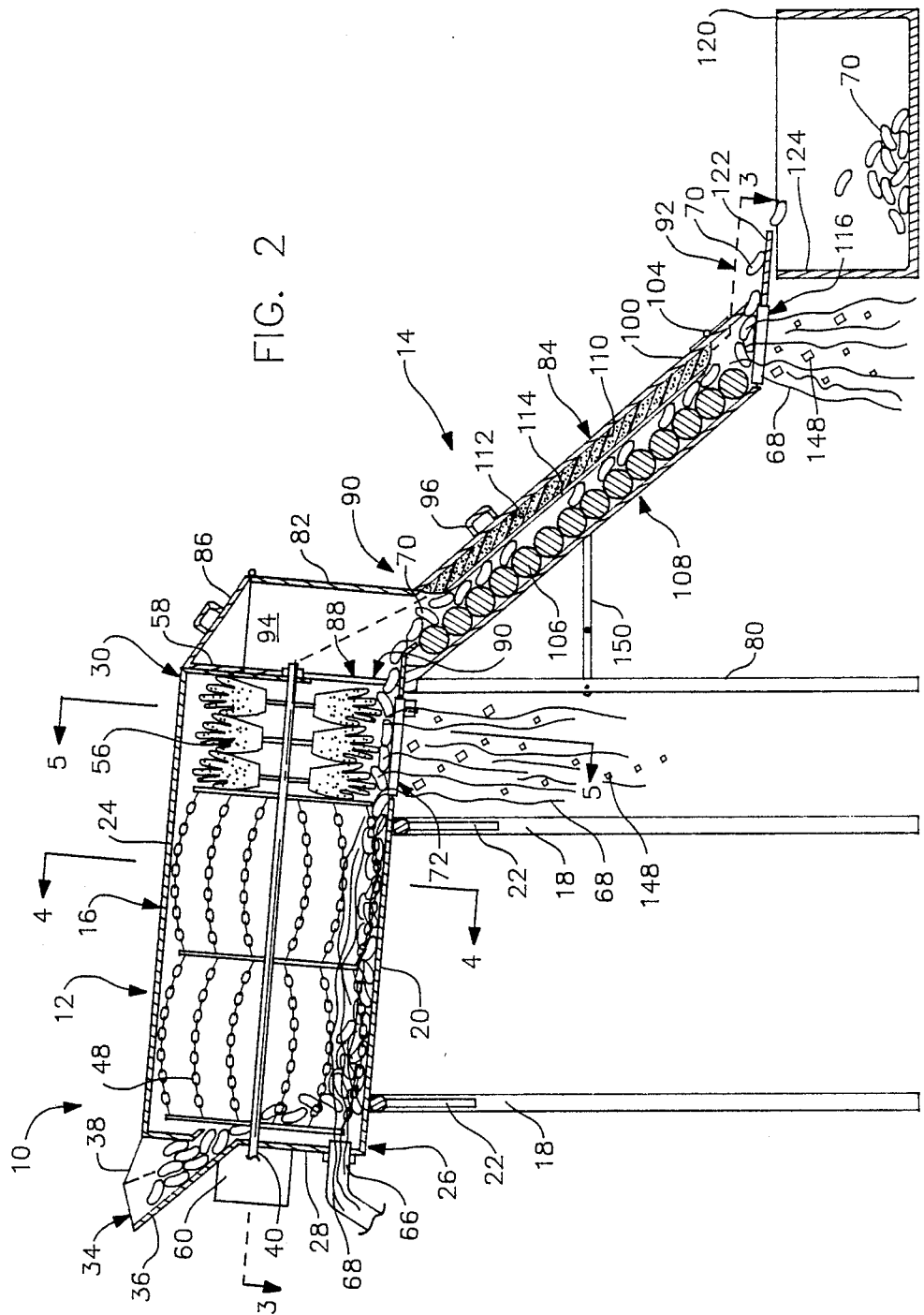
FIG. 2 is a cross-sectional side view of the assembled first and second stages of the mussel cleaning machine of FIG. 1.

A container 120 is placed at the end of the second stage 14 to catch the mussels 70 as they exit the machine 10 through an opening 126 formed between the lid 84 and the ledge 122. A small ledge 122 is formed after the second drain 116 to guide the mussels 70 from the drain 116 to the container 120. As shown in FIG. 2, the ledge 122 rests on the sidewall 124 of the container 120.

Figure 6:
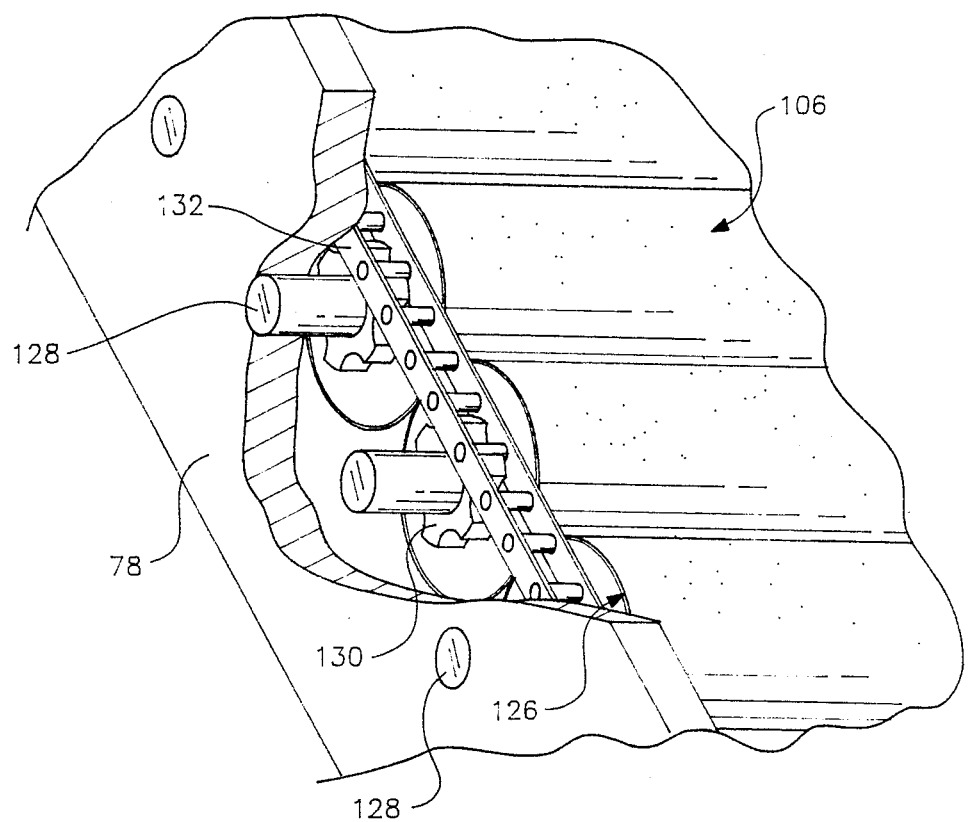
FIG. 6 is an isometric view in partial cutaway of the rollers mounted on the second stage of the mussel cleaning machine formed in accordance with the present invention.

Referring next to FIG. 6, the drive mechanism for the rollers 106 is illustrated. Each roller 106, as previously described, includes a layer 126 of abrasive material, such as sand paper or, preferably, thin metal grating. Each roller 106 has an axle 128 that is journaled in each side wall 78. A toothed gear 130 is mounted on each axle 128 and engages a roller chain 132. The roller chain 132 may be manually driven with the handle 134, shown more clearly in FIGS. 1 and 3, or may be mechanically driven by a motor such as an electric or hydraulic motor mounted within the motor housing 136. When the motor is operated, the roller chain 132 turns all of the rollers 106 in the same direction, in this case in a clockwise direction as viewed from the side in FIG. 2, to force the mussels 70 towards the discharge end 92 of the second stage 14.

To facilitate attachment and removal of the second stage 14, a transverse bracket 138 is formed on the bottom half 20 of the container 16 near the second end 30. The bracket 138 has L-shaped flanges 140 at each end with openings 142 formed therein. A pair of L-shaped posts 144 project outward and downward from the back wall 58 of the second stage 14, shown in FIG. 1. The L-shaped post 144 are sized to be received within the openings 142 on the transverse bracket 138 on the container 16. Thus, when the second stage 14 is placed into position adjacent the first stage 12, each post 144 will be received within the transverse bracket 138 to hold the stages in position. In addition, the shaft 40 projecting from the container 16 will be journaled in the backwall 58 as shown in FIG. 2.

The operation of the mussel cleaning machine 10 will now be described in conjunction with FIG. 2. As illustrated therein, the second stage 14 is attached to the first stage 12 and secured in position with the post 144 projecting through the openings 142 in the transverse bracket 138 on the first stage 12. In addition, the shaft 40 is journaled through the backwall 58 of the second stage 14. A pressurized source of water is connected to the fluid entry port 66 on the circular wall 28 to provide a constant flow of water from the first end 26 to the second end 30 of the container 16. The motor 60 is energized to rotate the shaft 40 and the attached chains 48 and gloves 56. Soft-shelled mussels 70 are fed into the first end 26 of the container 16 by placing them in the loading chute 34. The mussels 70 slide to the bottom half 20 of the container 16 where they are agitated by the rotating chains 48. Clumps of mussels 70 are broken apart by the flexible chains 48 and barnacles and other material on the outer shells of the mussel 70 are removed. The flexibility of the looped chains 48 provides a limited amount of cushioning of the fragile impact of the chains 48 on the mussels 70 to protect the shells of the mussels 70.

The flowing water 68 moves the mussels past the two rows of chains 48 to the series of rotating gloves 56. The rotating gloves 56 with their abrasive outer surfaces brush and roll the mussels across the bars 74 over the drain 72 to remove additional material from the shells. Water 68 and waste material 148 fall through the openings between the bars 74 while the mussels slide past the second end 30 and exit the container 16. To facilitate movement of the mussels through the machine 10, the container 16 has the first end 26 vertically elevated above the second end 30 to provide a slight incline in the bottom half 20.

Mussels exiting the container 16 pass through the opening 88 in the backwall 58 of the second stage 14 and slide downward onto the series of abrasive rollers 106. With the rollers 106 driven in a clockwise direction as viewed in FIG. 2, the mussels 70 are squeezed between the compressible material 112 and the rollers 106 as they move towards the discharge end 92. Additional water may be supplied at the second stage 14 through the hopper 94. Waste material 148 removed from the mussels in the second stage 14 falls through the second drain 116 while the mussels 70 slide over the rods 118 and into the container 120. As described above, the rollers 106 may be powered manually with the handle 134 or with an electric or hydraulic motor located in the housing 136.

If desired, the second stage 14 can be easily removed from the first stage 12 and transported off-site to a remote location. To facilitate transportation, the legs 80 are pivotally attached to the frame 76 and supported with a hinged bracket 150 such that the legs 80 may be folded against the frame 76. Once the second stage 14 is positioned at the desired location, the legs 80 are unfolded and the discharge end 92 is supported on a container 120. Mussels 70 and water are then loaded through the hopper 94 and the rollers 106 are turned with the handle 134. The mussels 70 may be fed through the hopper 94 a second time to provide additional cleaning if needed or desired.

While a preferred embodiment of the invention has been illustrated and described herein, it is to be understood that various changes may be made therein without departing from the spirit and scope of the invention. For instance, a plastic lining may be formed around the interior of the container 16 to absorb noise and provide a more quiet operation. In addition, the chains 48 can be replaced with other flexible filament material that has an abrasive exterior and sufficient weight to break apart clumps of mussels and remove material from the exterior shell of the mussels without damaging them, such as knotted cable. Furthermore, the gloves 58 may also be replaced with brushes having medium to soft bristles that roll and brush the mussels. Finally, the rollers 106 may also be replaced by a conveyor formed of a continuous belt to move the mussels through the second stage 14. Consequently, the invention is to be limited only by the scope of the claims that follow.

The embodiments of the invention in which an exclusive property or privilege is claimed are defined as follows:

1. A cultured mussel cleaning machine for cleaning fragile-shelled mussels, the machine comprising:
   means for containing a plurality of fragile-shelled mussels and water, said containing means having an inlet into which the mussels are placed and an outlet through which the mussels exit;

means for agitating the mussels, said agitating means being positioned adjacent to and downstream from said inlet to break apart mussels clumped together and to remove unwanted material from the mussel shells;

means for brushing and rolling the mussels to remove additional unwanted material from the exterior of the mussels, said brushing and rolling means being positioned downstream from said agitating means; and means for scrubbing the mussels, said scrubbing means being positioned downstream from said brushing and rolling means and adjacent said outlet.

2. The machine of claim 1, wherein said containing means is formed of two removable sections, a first section that includes said agitating means and said brushing and rolling means, and a second section that includes said scrubbing means.

3. The machine of claim 1, further including a first motor means for operating said agitating means and said brushing and rolling means, and a second motor means for operating said scrubbing means.

4. The machine of claim 1, further including a water port for admitting pressurized water into said containing means to force the mussels to move from the inlet to the outlet.

5. The machine of claim 4, wherein said containing means further includes one or more drains through which only water and waste material are removed.

6. A cultured mussel cleaning machine for cleaning fragile-shelled mussels, the machine comprising:

a container for holding water and a plurality of mussels, said container having an inlet into which mussels are placed and an outlet through which mussels exit, said container further including a fluid port adjacent said inlet to admit pressurized water into said container for forcing mussels to move towards said outlet, and one or more drains for allowing only water and waste material to drain therefrom;

a flexible agitator positioned adjacent said inlet for separating mussels from one another and removing waste material from the exterior of the mussels without damaging the mussel shell;

one or more compliant brushing members positioned downstream from said flexible agitator for brushing and rolling the mussels to further remove waste material from the exterior of the mussels without damaging the mussel shell; and one or more abrasive scrubbers positioned downstream from said one or more compliant brushing members and adjacent said outlet for removing additional waste material from the exterior of the mussels without damaging the mussel shell.

7. The machine of claim 6, wherein said container is formed of two detachable stages, a first stage that includes said agitator and said one or more compliant brushing members and a second stage that includes said one or more scrubbers.

8. The machine of claim 7, wherein said flexible agitator comprises one or more loops of flexible filaments mounted on a rotating frame.

9. The machine of claim 8, wherein each of said flexible filaments are formed of metal chain.

10. The machine of claim 8, wherein said one or more compliant brushing members comprises one or more abrasive hand gloves, each of said gloves being mounted on a pivoting rod.

11. The machine of claim 10, wherein each of said pivoting rods are mounted on a common shaft with said flexible agitator such that rotation of said common shaft rotates said flexible agitator and said compliant beaters.

12. The machine of claim 11, further including a motor means for rotating said common shaft.

13. The machine of claim 10, wherein said one or more abrasive scrubbers comprises one or more abrasive rollers positioned below an abrasive, compressible roof a distance such that mussels will be gently pressed between said one or more rollers and said roof.

14. A cultured mussel cleaning machine for cleaning fragile-shelled mussels, the machine comprising:

a first stage, said first stage comprising:
(a) an elongate, enclosed container for holding water and mussels, said container having a loading chute at one end for loading mussels into said container and an outlet at the other end through which mussels exit said container, said container further including a first port adjacent said loading chute for admitting pressurized fluid into said container to force mussels to move toward said outlet, and a drain located adjacent said outlet for draining fluid and waste material from said container;
(b) a plurality of looped, flexible filaments positioned adjacent said loading chute and mounted to rotate about the longitudinal axis of said elongate container to contact and break apart mussels that are clumped together and knock unwanted material from the exterior of the mussels without damaging the shell of the mussels; and
(c) a plurality of compliant, abrasive brushes positioned downstream from said plurality of looped, flexible filaments for brushing and rolling the mussels to further clean the exterior of the mussels without damaging the shell of the mussels;

a second stage that is removably attached to said first stage, said second stage comprising:
(a) a frame having a receiving end and a discharge end, said receiving end being configured to receive mussels from said outlet of said first stage when said second stage is attached to said first stage;
(b) a plurality of rollers having abrasive surfaces, said rollers being mounted on said frame adjacent each other and in coplanar relationship between said receiving end and said discharge end, said rollers being coupled to a common driver for rotating each of said rollers in the same direction to thereby support and move the mussels across said abrasive surfaces of said rollers; and
(c) a lid mounted on said frame to cover said plurality of rollers, said lid having an inside surface lined with a compressible material that is spaced a distance from said rollers such that mussels passing over said abrasive surfaces of said rollers will be pressed between said compressible material and said rollers to remove additional unwanted material from said mussels without damaging the shell of the mussels.

15. The machine of claim 14, wherein said frame is inclined such that said receiving end is positioned vertically higher than said discharge end.

16. The machine of claim 14, wherein said compressible material on said lid has an exposed surface that is lined with abrasive material.

17. The machine of claim 14, further including a loading chute positioned on said frame above said receiving end to permit independent loading of water and mussels into said second stage.

18. The machine of claim 14, wherein said flexible filaments and said plurality of complaint brushes are mounted on a common shaft that is turned by a single motor means.

19. The machine of claim 18, wherein said complaint, abrasive brushes are formed of complaint, abrasive gloves that are each mounted on the end of a rod radially projecting from said common shaft.

20. The machine of claim 19, wherein said looped, flexible filaments are formed of metal chain.

* * * * *